US011062360B1

(12) United States Patent
Donamukkala et al.

(10) Patent No.: US 11,062,360 B1
(45) Date of Patent: Jul. 13, 2021

(54) OPTIMIZING CONVERSION RATES FOR IMPRESSIONS PROVIDED IN A NETWORKING SYSTEM

(71) Applicant: Facebook, Inc., Menlo Park, CA (US)

(72) Inventors: Raghavendra Rao Donamukkala, San Jose, CA (US); Zheng Chen, Mountain View, CA (US); Toby Jonas F Roessingh, Woodside, CA (US); Shyamsundar Rajaram, San Francisco, CA (US); Leon R Cho, Chicago, IL (US)

(73) Assignee: FACEBOOK, INC., Menlo Park, CA (US)

( * ) Notice: Subject to any disclaimer, the term of this patent is extended or adjusted under 35 U.S.C. 154(b) by 415 days.

(21) Appl. No.: 15/899,581

(22) Filed: Feb. 20, 2018

Related U.S. Application Data

(60) Provisional application No. 62/567,152, filed on Oct. 2, 2017.

(51) Int. Cl.
*G06Q 30/02* (2012.01)
*G06K 9/62* (2006.01)
*G06N 20/00* (2019.01)

(52) U.S. Cl.
CPC ....... *G06Q 30/0269* (2013.01); *G06K 9/6256* (2013.01); *G06N 20/00* (2019.01); *G06Q 30/0242* (2013.01); *G06Q 30/0277* (2013.01)

(58) Field of Classification Search
USPC ...................................... 705/14, 319, 14.41
See application file for complete search history.

(56) References Cited

U.S. PATENT DOCUMENTS

| | | | | |
|---|---|---|---|---|
| 2006/0015404 | A1* | 1/2006 | Tran | G06Q 30/00 705/14.25 |
| 2013/0124298 | A1* | 5/2013 | Li | G06Q 30/0241 705/14.42 |
| 2015/0154632 | A1* | 6/2015 | Jindal | G06Q 30/0246 705/14.45 |
| 2015/0161658 | A1* | 6/2015 | Little | G06Q 30/0246 705/14.45 |

(Continued)

OTHER PUBLICATIONS

Real Time Bid Optimization with Smooth Budget Delivery in Online Advertising (Year: 2013).*

(Continued)

*Primary Examiner* — Gautam Ubale
(74) *Attorney, Agent, or Firm* — Keller Jolley Preece

(57) ABSTRACT

The present disclosure is directed toward systems and methods for optimizing view-through conversion rates. For example, systems and methods described herein train and utilize a machine learning model that predicts whether providing a digital impression to a particular networking system user will result in a conversion. Systems and methods described herein identify view-through conversions by generating a vector associated with the provision of a digital impression to a networking system user and receiving third-party conversion information during an attribution window. The systems and methods described herein then utilize the vector and conversion information to train the machine learning model to predict future conversions.

20 Claims, 6 Drawing Sheets

(56) References Cited

U.S. PATENT DOCUMENTS

2017/0061528 A1\* 3/2017 Arora .................... G06F 16/958
2018/0075475 A1\* 3/2018 Pai ..................... G06Q 30/0244

OTHER PUBLICATIONS

User Action Interpretation for online content optimization (Year: 2013).\*

Conversion Prediction in Search Advertising Using Latent Topic Models (Year: 2014).\*

\* cited by examiner

OPTIMIZING CONVERSION RATES FOR IMPRESSIONS PROVIDED IN A NETWORKING SYSTEM

CROSS REFERENCE TO RELATED APPLICATIONS

This application claims priority to and the benefit of U.S. Provisional Application No. 62/567,152, filed Oct. 2, 2017, the entire contents of which are hereby incorporated by reference.

BACKGROUND

Optimization of conversion rates is an important issue for most companies. For example, a company generally wants its digital impressions (e.g., digital advertisements) to be provided to users who are most likely to perform some desired action in response to seeing the digital impression. To illustrate, if a company sells widgets, that company generally wants its digital impressions to be provided to and seen by users who are most likely to eventually purchase a widget from the company. For example, the purchase action is the conversion in which the company is interested. In another example, a conversion in which a company is most interested is simply driving traffic to one or more of its web pages. In that example, the company will want its digital impression provided to and seen by users who are most likely to visit one or more of the desired web pages in response to seeing the digital impression.

Regardless of the desired conversion, many conventional optimization systems focus on "click-through" conversion rates. For example, a conventional system provides a digital impression to a user and then tracks whether the user clicks on the digital impression. Accordingly, conventional systems overlook other valuable cross-sections of users whose actions related to a digital impression result in a conversion even though they never clicked on that digital impression. For example, in an online environment where a user may view multiple digital impressions, there may be a gap in time between when the user views a digital impression and when the user actually visits a web page, purchases a product, or takes some other action associated with the digital impression. For instance, a user may briefly view a digital impression only to manually input the URL associated with the web page corresponding to the digital impression an hour later. If the user engages in activities on that web page that result in a conversion, conventional systems will fail to identify the digital impression previously viewed by the user as the force that drove that conversion. Furthermore, the conventional systems fail to account for such additional conversions when optimizing delivery of future digital impressions.

Accordingly, a need exists for a system that accounts for conversion rates associated with a wider range of user interactions relative to a digital impression.

BRIEF SUMMARY

One or more embodiments described herein provide benefits and/or solve one or more of the foregoing or other problems in the art with systems and methods for optimizing conversion rates based on digital impression views ("view-through conversion") in addition to digital impression clicks ("click-through conversion"). For example, in one or more embodiments, the systems and methods described herein track view-through conversions in addition to click-through conversion and utilize that information to train a machine learning model that predicts future conversions for both types of interactions. Thus, systems and methods provided herein enable companies to provide digital impressions to users who will likely engage in activities that lead to a conversion, even when those users do not necessarily click on the digital impressions.

Additional features and advantages of the present application will be set forth in the description as follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which.

DETAILED DESCRIPTION

Figure 1:
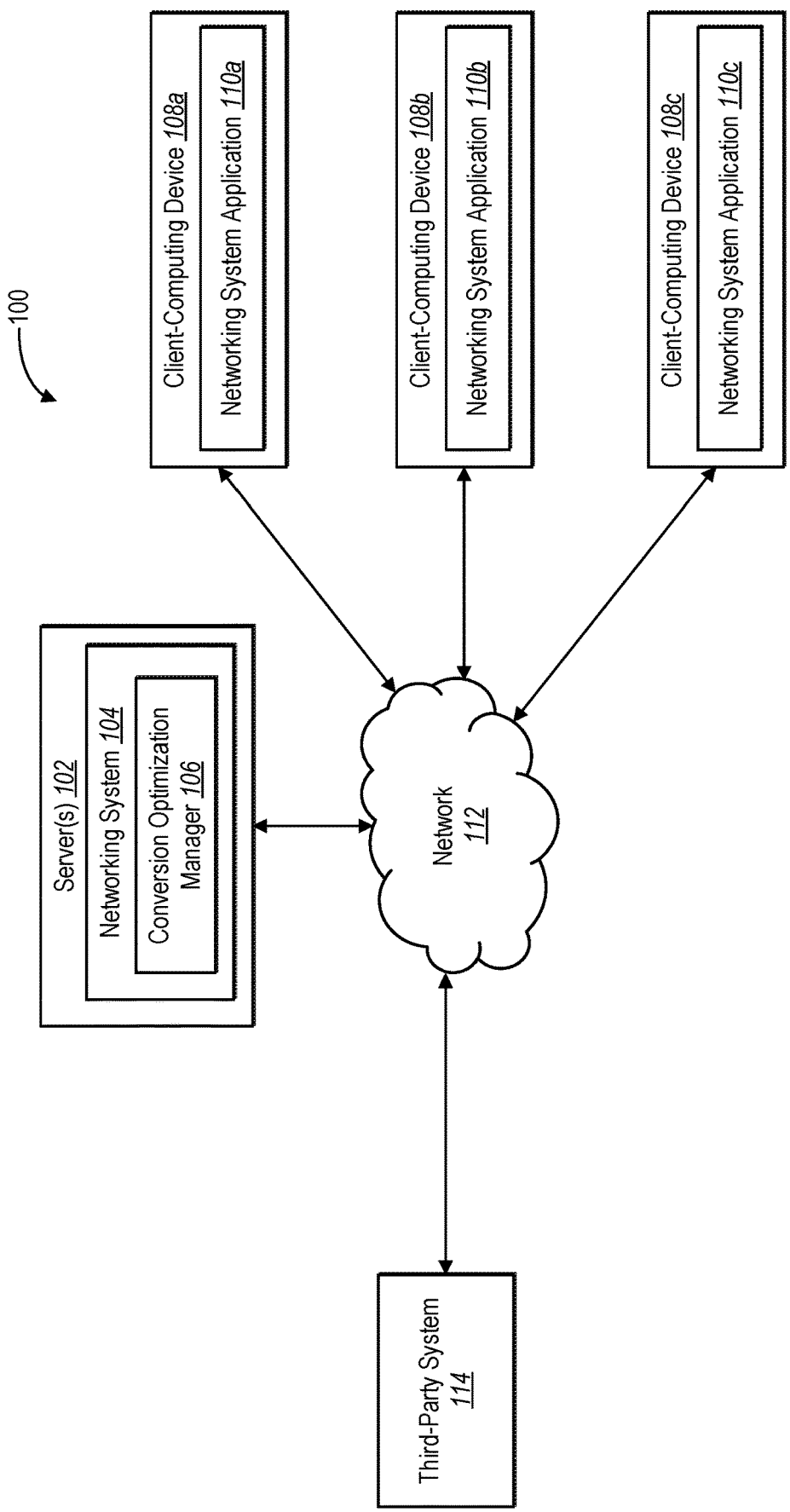
FIG. 1 illustrates an environmental diagram of an optimization system in accordance with one or more embodiments.

In one or more embodiments, an optimization system optimizes conversion rates based on "view-through" user activities, as well as other types of user activities. In particular, the optimization system utilizes a machine learning model that predicts conversions based on user activities relative to a digital impression. Over time, the optimization system trains the machine learning model to predict successful conversions based on view-through activities associated with networking system users.

Accordingly, the optimization system provides a number of advantages over conventional optimization systems. For example, as described above, conventional optimization systems are generally concerned only with click-through conversion rates; ignoring conversions that result from other types of user activities. As such, the present optimization system creates computational efficiencies by providing more accurate conversion rate predictions based on a wider range of user activities. To illustrate, a company utilizing the present optimization system receives accurate conversion rate predictions for all networking system users who interact with a digital impression, whether those interactions are clicks in connection with the digital impression or simply views of the digital impression.

Additionally, the present optimization system provides other advantages over conventional optimization systems. For example, the present optimization system creates a more effective and personalized user experience for networking system users who are provided with digital impressions. For example, because conventional optimization systems only optimize click-through conversion rates, companies tend to compete for the display space of only "clicky" users (e.g., users who tend to click on digital impressions often). As such, those "clicky" users are provided with digital impressions that are mostly likely to be of interest to them, while other users who are less "clicky" tend to be provided with digital impressions that are not specifically tailored to them. Thus, conventional optimization systems lead to wasted display space for networking system users who interact with digital impressions in other non-click ways.

To illustrate the features of the present optimization system, an example embodiment includes the optimization system receiving campaign configuration information from a third party (e.g., a business, merchant, seller, or simply campaign owner) that defines one or more ad sets that each include one or more digital impressions. The campaign configuration also includes target conversion goals and target demographic information. For example, the third party can configure the campaign objectives to optimize conversions among networking system users aged 20-35 who live in the Southwest region of the United States. Further, the third party can configure the target conversion goals to include a purchase event associated with a particular product offered via an e-commerce website.

In response to receiving the campaign configuration information from the third party, the optimization system begins generating and providing digital impressions to networking system users. For example, the optimization system generates a digital asset to include text, digital media, and/or a link to a web page associated with the third party. Following the creation of the digital asset, the optimization system identifies one or more networking system users to whom the digital asset can be provided as a digital impression. For example, the optimization system identifies networking system users who correlate to the target demographic information included in the campaign configuration information. For instance, the optimization system can identify networking system users who are aged 20-35 who live in the Southwest by analyzing profile and other networking system information associated with each networking system user.

In order to provide the digital impression to only those networking system users who are most likely to perform the actions that lead to a conversion, the optimization system builds and trains a machine learning model to predict conversion rates for networking system users based on past data. For example, the optimization system builds and initially trains the machine learning model with training data that indicates a probability that each user with perform the target action in response to viewing the digital impression. In one or more embodiments, the general training data trains the machine learning model to predict conversion outcomes based on the strength of the correlation between the demographic information for a particular networking system user and the target demographic information included in the campaign information. Additionally, in at least one embodiment, the general training data trains the machine learning model to predict conversion outcomes based on historical conversion information associated with a networking system.

If the machine learning model predicts that providing the digital impression to a particular networking system user will result in a conversion, the optimization system provides the digital impression to the networking system user as part of the networking system user's newsfeed. At this point, the networking system user can interact with the provided digital impression in a variety of ways. As discussed above, many conventional systems only optimize delivery of digital impressions based on the likelihood of click-through conversions. The present optimization system also optimizes delivery of digital impressions to account for view-through conversions.

To optimize delivery of digital impressions based on view-through conversions, the disclosed system identifies past data indicating conversions resulting from views where the user did not click on the digital impression. For example, in response to detecting that the networking system user has viewed a digital impression (e.g., based on a scroll stop, based on eye tracking), the optimization system begins an attribution window associated with that instance of the digital impression. For example, the attribution window can be a predetermined amount of time during which the optimization system will store information associated with the provision of the digital impression to that networking system user. The attribution window can be any amount of time, but is generally a few hours. In one or more embodiments, the optimization system can receive conversion information from a third-party that is associated with that instance of the digital impression at any time during the attribution window. If the attribution window expires without the optimization system receiving any conversion information, the optimization system determines that no conversion associated with that instance of the digital impression has occurred.

Additionally, in response to detecting that the networking system user has viewed the digital impression, the optimization system generates a vector including features associated with that instance of the digital impression, features associated with the networking system user, and features associated with context in which the digital impression was provided to the networking system user. In one or more embodiments, at some point following the detected viewing of the digital impression, the optimization system receives conversion information from the third party. For example, the optimization system can receive conversion information (e.g., that a successful conversion occurred, the type of the conversion) as part of a system call triggered by a tracking pixel on a third-party web page, or by the execution of a portion of computer code in an installed software application. In any event, the system associates the generated vector with whether the corresponding digital impression resulted in a conversion.

The optimization system then combines generated vectors associated with click-through conversions and generated vectors associated with view-through conversions to train a machine learning model to optimize delivery of future digital impressions based on both click-through conversions and view-through conversions. Over time, as more digital impressions are provided to networking system users and the optimization system continually trains the machine learning model with the generated vectors as model inputs and the observed conversion information as the desired output, the machine learning model optimizes delivery of digital impressions based on the prediction of conversions that result from providing digital impressions to additional networking system users.

As mentioned, the system trains the machine learning model based on view-through conversions as well as on click-through conversions. Thus, the trained machine learning model can receive the demographic information for a particular networking system user and accurately predict whether providing the digital impression to that networking system user will result in conversion, regardless of how the networking system user interacts with the digital impression. Accordingly, the trained machine learning model optimizes conversion rates associated with the digital impression.

As used herein, a "digital impression" refers to an instance of a digital asset (e.g., displayed online content) provided to a networking system user's web-enabled computing device. For example, in one or more embodiments, a digital impression is a clickable digital advertisement including digital media (e.g., digital image, digital video), text, interactive elements (e.g., 360-degree display), and networking system elements (e.g., a "like" button, comments). In one or more embodiments, in response to a detected user click on a digital impression, the optimization system redirects the user to a URL associated with the digital impression (e.g., a business web page or profile page).

In one or more embodiments, a digital impression can include providing a digital asset from an ad set in an advertisement campaign. For example, a business can configure an advertisement campaign through the optimization system that includes one or more digital assets. Each digital asset can be provided to users through one or more digital impressions. Each digital asset can include different elements even though all the digital impressions associated with advertising campaign may have the same conversion objective. In at least one embodiment, the optimization system provides one or more digital impressions in a networking system user's newsfeed inserted among organic networking system content (e.g., posts from networking system friends, posts from groups the user has joined).

Also, as used herein, a "conversion" refers to completion of a particular business objective. For example, a retail business may have objectives that are associated with product sales. Thus, for that business a conversion would be the purchase of a particular product. In a digital environment, a conversion can be a digital purchase (e.g., a purchase made through an e-commerce website), a visit to a particular web page, a digital download (e.g., a software download), etc. It follows that a "click-through conversion rate" refers to a percentage of networking system users who clicked on a particular digital impression and then perform the activities required to qualify as a conversion (e.g., make a purchase, complete a download). Similarly, a "view-through conversion rate" refers to a percentage of networking system users who view a digital impression but do not click on the digital impression, and then go on to perform the activities required to qualify as a conversion.

Further used herein, an "attribution window" refers to the period of time within which a user performs the activities required to qualify as a conversion after viewing a digital impression in order to qualify as a view-through conversion. For example, as mentioned above, there is typically a gap in time between when a user views a digital impression and when the user goes on to perform the conversion activity. In one or more embodiments, due to digital memory constraints and other considerations, the optimization system does not allow for this gap in time to be boundless. Accordingly, the optimization system typically allows for the attribution window associated with a particular digital impression to be up to several hours.

FIG. 1 illustrates an example block diagram of an environment for implementing the optimization system 100. As illustrated in FIG. 1, the environment includes the server(s) 102 hosting the networking system 104 including the conversion optimization manager 106. Additionally, illustrated in FIG. 1, the environment includes the client-computing device 108a, the client-computing device 108b, and the client-computing device 108c, each including the networking system application 110a, networking system application 110b, and networking system application 110c, respectively. Further, the environment includes the third-party system 114.

The client-computing devices 108a-108c, the server(s) 102, and the third-party system 114 communicate via a network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 112 are explained below with reference to FIG. 5.

Although FIG. 1 illustrates a particular number and arrangement of client-computing devices, in additional embodiments the client-computing device 108a-108c may directly communicate with the networking system 104, bypassing the network 112. Further, in other embodiments, the environment may include any number of client-computing devices. Additional details with respect to the client-computing devices 108a-108c are discussed below with respect to FIG. 4.

In one or more embodiments, the client-computing devices 108a-108c can be one of various types of computing devices. For example, each of the client-computing devices 108a-108c may include a mobile device such as a mobile telephone, a smartphone, a PDA, a tablet, or a laptop. Additionally or alternatively, the client-computing devices 108a-108c may include a non-mobile device such as a desktop computer, a server, or another type of computing device.

In one or more embodiment, each of the client-computing devices 108a, 108b, and 108c include a networking system application 110a, 110b, and 110c, respectively, associated with the networking system 104. For example, the networking system application 110a-110c enables the user of the client-computing devices 108a-108c to view and interact with networking system content including digital impressions, and to submit media communications, posts, and other content to other users via the networking system 104. In at least one embodiment, media communications and other content submitted to the networking system 104 from the client-computing device 108a can be viewed and interacted with at the client-computing devices 108b and/or 108c, and vice versa.

Further, in one or more embodiments, the optimization system 100 provides digital impressions to the users of the client-computing devices 108a-108c via the networking system applications 110a-110c, respectively. For example, in one or more embodiments, the optimization system 100 provides digital impressions to the users of the client-computing device 108a-108c via personalized networking system newsfeeds. In at least one embodiment, each user's newsfeed includes posts from networking system "friends" and groups, as well as comments and other networking system activities associated with those posts. In one or more embodiments, as will be described in greater detail below, the optimization system 100 determines digital impressions to provide to a particular user based on a variety of considerations. The optimization system 100 then inserts the determined digital impressions into that user's newsfeed among the other organic networking system content.

In one or more embodiments, the networking system applications 110a-110c are native applications installed on the client-computing devices 108a-108c, respectively. For example, the networking system applications 110a-110c can be mobile applications that install and run on a mobile device, such as a smart phone or tablet computer. Alternatively, the networking system applications 110a-110c can be desktop applications, widgets, or other forms of native computer programs. Furthermore, the networking system applications 110a-110c may be remote applications accessed by the client-computing devices 108a-108c, respectively. For example, the networking system applications 110a-110c may be web applications that are executed within a web browser of the client-computing devices 108a-108c, respectively.

As shown in FIG. 1, and as mentioned above, the server(s) 102 hosts the networking system 104. In one or more embodiments, the networking system 104 provides digital impressions, posts, electronic messages, structured objects, and live video streams to one or more networking system users (e.g., by way of a newsfeed, a profile, a communication thread, a timeline, a "wall," a live video stream display, or any other type of graphical user interface presented via a networking system application). For example, one or more embodiments provide a user with a networking system newsfeed containing posts from one or more co-users associated with the user (e.g., the user's "friends"). In one or more embodiments, a networking system post and/or electronic message can include one or more media communications (e.g., text, digital images, digital video), such as described above.

In one or more embodiments, a networking system user scrolls through his or her networking system newsfeed in order to view recent networking system posts submitted by the one or more co-users associated with the user via the networking system 104. In one embodiment, the networking system 104 organizes the networking system posts chronologically in a user's networking system newsfeed or "wall." In alternative embodiments, the networking system 104 organizes the networking system posts geographically, by interest groups, according to a relationship coefficient between the user and the co-user, etc.

The networking system 104 also enables a networking system user to engage in all other types of networking system activities. For example, the networking system 104 enables a networking system user to interact with digital assets provided as digital impressions, interact with communication threads, click on posts and hyperlinks, compose and submit electronic messages and posts, interact with structured objects, watch live video streams, interact with media communications, and so forth.

The environment illustrated in FIG. 1 further includes a third-party system 114. In one or more embodiments, the third-party system 114 includes one or more servers (e.g., web servers) by way of which a third-party (e.g., a business, a merchant, a seller, a campaign owner) configures a campaign for providing digital assets as digital impressions to networking system users. For example, in at least one embodiment, the third-party system 114 provides the conversion optimization manager 106 with digital media, text, and other elements that are included in digital assets. Further, in at least one embodiment, the third-party system 114 provides campaign configuration information associated with a campaign that includes one or more digital assets. For example, the third-party system 114 provides campaign configuration information such as target demographics information, a definition of conversion activities, and a desired conversion rate.

Additionally, the third-party system 114 can include one or more servers where activities that define a conversion can occur. For example, in an embodiment where the desired conversion activity is an e-commerce purchase, a web server that is part of the third-party system 114 can serve one or more web pages including computer code representing a tracking pixel that, when triggered, sends conversion information to the networking system 104 for use by the optimization system 100. In another example where the conversion activity is a software download, a file server that is part of the third-party system 114 can initialize an API call to the networking system 104 including conversion information upon the successful download of the software. In yet another example where the conversion activity is a software installation, the software computer code can execute an SDK system call including conversion information when the software successfully installs on a client device. Thus, in one or more embodiments, when a user interacts with a digital asset provided as a digital impression via the networking system 104 and then performs activities associated with a successful conversion, the third-party system 114 can provide conversion information associated with that user and the performed activities to the networking system 104.

Figure 2:
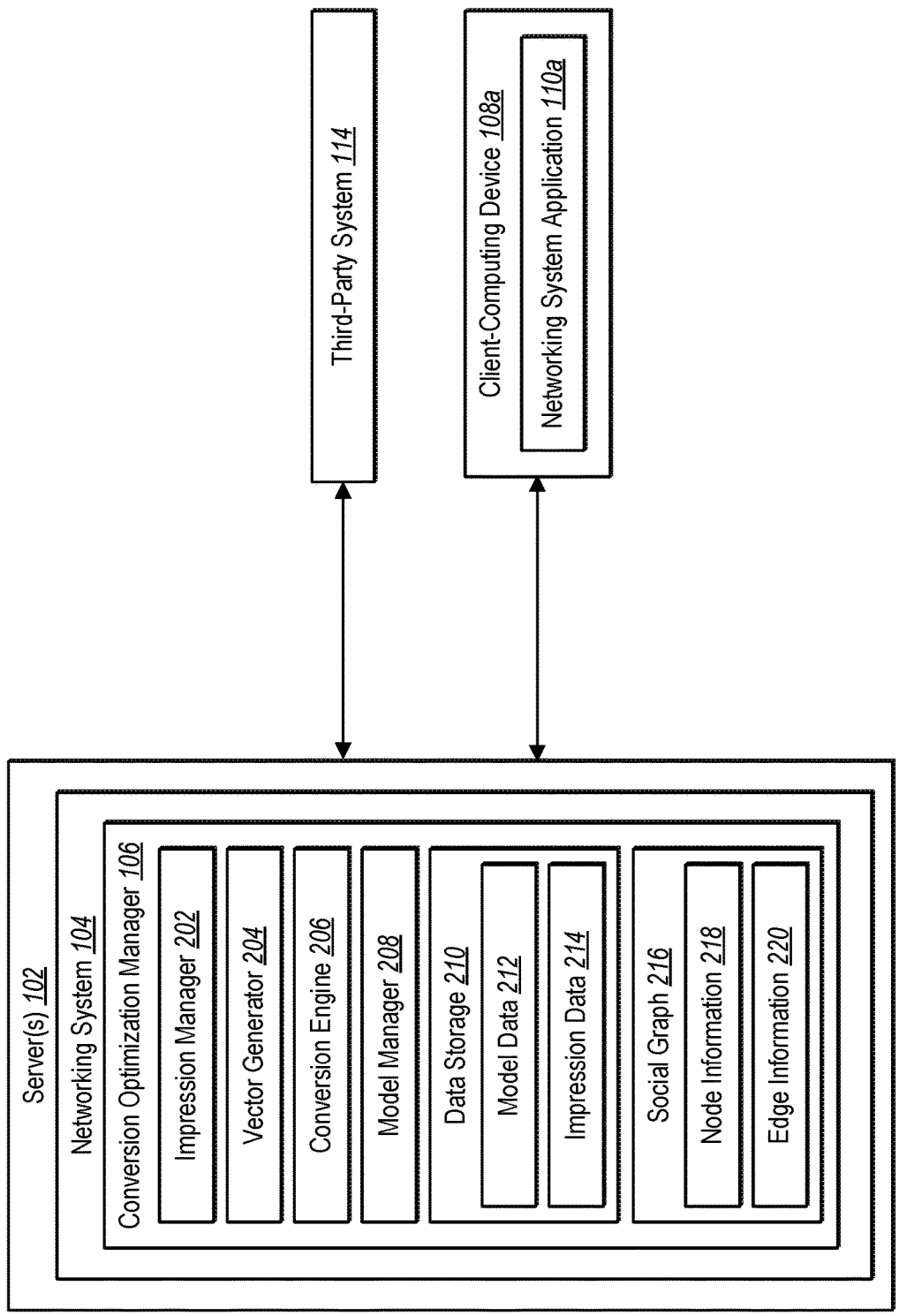
FIG. 2 illustrates a detailed schematic diagram of the optimization system in accordance with one or more embodiments.

FIG. 2 illustrates a schematic diagram illustrating an example embodiment of the optimization system 100. As shown in FIG. 1, the conversion optimization manager 106 is implemented by the networking system 104 hosted by the server(s) 102, and includes various components for performing the processes and features described herein. For example, as shown in FIG. 2, the conversion optimization manager 106 includes, but is not limited to an impression manager 202, a vector generator 204, a conversion engine 206, a model manager 208, and a data storage 210 including model data 212 and impression data 214.

In at least one embodiment, the optimization system 100 accesses the networking system 104 in order to identify and analyze networking system user data. Accordingly, as shown in FIG. 2, the networking system 104 includes the social graph 216 for representing a plurality of users, actions, and concepts. For example, in one or more embodiments, the social graph 216 is accessible by the networking system 104. In one or more embodiments, the social graph 216 includes node information 218 and edge information 220. Node information 218 of the social graph 216 stores information including, for example, nodes for users and nodes for repositories. Edge information 220 of the social graph 216 stores information including relationships between nodes and/or actions occurring within the networking system 104. Further details regarding the networking system 104, the social graph 216, edges, and nodes are presented below with respect to FIG. 6.

Each of the components 202-220 of the conversion optimization manager 106 can be implemented using a computing device including at least one processor executing instructions that cause the optimization system 100 to perform the processes described herein. In some embodiments, the components of the optimization system 100 can be implemented by the server(s) 102, or across multiple server devices. Additionally or alternatively, a combination of one or more server devices and one or more client devices can implement the components of the optimization system 100. Additionally or alternatively, the components of the optimization system 100 can comprise a combination of computer-executable instructions and hardware.

As mentioned above, and as illustrated in FIG. 2, the networking system 104 includes the conversion optimization manager 106. In one or more embodiments, the conversion optimization manager 106 provides the functions and features of the optimization system 100. For example, in at least one embodiment, the conversion optimization manager 106 configures campaigns including one or more digital impressions, identifies networking system users associated with high conversion probabilities according to the parameters of a campaign, provides one or more digital impressions to the identified networking system users, determines when conversion activities occur within the parameters of the campaign in response to both user click-through activities and user view-through activities, and builds and trains a machine learning model to optimize delivery of digital impressions to account for view-through conversions. In this way, the conversion optimization manager 106 optimizes conversion rates associated with both click-through behaviors as well as conversion rates associated with view-through behaviors. Accordingly, the conversion optimization manager 106 provides a business with greater value by ensuring that the business's digital impressions are provided to networking system users who are most likely to enact the activities that constitute conversion. Similarly, the conversion optimization manager 106 provides networking system users with greater value by ensuring digital impressions are provided to those users who are most likely to be interested in them.

As shown in FIG. 2, the conversion optimization manager 106 includes the impression manager 202. In one or more embodiments, the impression manager 202 handles all activities associated with configuring and providing digital impressions to networking system users. For example, in at least one embodiment, the impression manager 202 receives configuration information from the third-party system 114, where the configuration information makes up the parameters of a campaign. As mentioned above, a campaign can include one or more ad sets, and each ad set can include one or more digital impressions. In one or more embodiments, the impression manager 202 receives configuration information including a budget associated with the campaign, a duration associated with the campaign, a conversion objectives associated with the campaign (e.g., a target conversion rate, target demographic information), a number of ad sets associated with the campaign, an audience and schedule associated with each ad set, text and digital media (e.g., images, videos, video streams, interactive elements) associated with each digital impression, and a URL associated with each digital impression. In at least one embodiment, digital impressions, ad sets, and campaigns are hierarchically organized such that a digital impression inherits the attributes of its associated ad set, and the ad set inherits the attributes of its associated campaign.

In one or more embodiments, the impression manager 202 generates one or more digital impressions based on the received campaign information. For example, in at least one embodiment, the impression manager 202 generates one or more networking system posts including combinations of the received text, digital media, and URLs. For instance, the impression manager 202 generates each digital impression to include text related to the third party who provided the configuration information (e.g., "Having back pain? Check out the #1 best-selling shoe insole!"), digital media (e.g., a digital image of a shoe insole), and a URL (e.g., "www.shoe-insoles.com" associated with the digital media or networking system post such that either are "clickable," or as a standalone URL).

Furthermore, the impression manager 202 identifies one or more networking system users to whom a digital impression should be provided. For example, in one or more embodiments, the impression manager 202 initially identifies networking system users based on target demographic information provided as part of the conversion objectives associated with the campaign from the third-party system 114. To illustrate, the target demographic information may include target demographic information such as a target audience size (e.g., 25K users), a target audience age (e.g., 20-35 years old), a target audience gender (e.g., male), a target audience location (e.g., southwest region), and so forth. In at least one embodiment, the impression manager 202 identifies the networking system users to whom the digital impression should be provided by matching networking system user information to the provided target demographic information. Furthermore, in one or more embodiments, the impression manager 202 provides this information to the vector generator 204, as will be described in greater detail below.

As will also be described in greater detail below, the model manager 208 utilizes a machine learning model to determine the likelihood that providing a digital impression to a particular networking system user will result in a conversion. In one or more embodiments, the model manager 208 determines this likelihood for each of the networking system users identified by the impression manager 202 in response to receiving target demographic information, as described above. Accordingly, in response to receiving these determinations from the model manager 208 the impression manager 202 can determine whether to provide a digital impression to each identified networking system user. For example, the impression manager 202 can determine to provide a digital impression to a networking system user when the likelihood associated with that user is above a predetermined threshold. For instance, the likelihood can be represented as a probability percentage (e.g., 80% likely to result in a conversion). If the impression manager 202 determines the likelihood associated with a particular networking system user is above the threshold, the impression manager 202 can provide the digital asset as a digital impression to that user. Alternatively, in at least one embodiment, the model manager 208 may output a "1" for a likely determination, and a "0" for an un-likely determining. In that embodiment, the impression manager 202 can provide the digital impression to networking system users associated with a "1" output, and not to networking system users associated with a "0" output.

Furthermore, the impression manager 202 also detects interactions with a provided digital impression. For example, as described above, a networking system user can interact with a digital impression in a variety of ways. In one or more embodiments, the impression manager 202 can detect a click in association with a provided digital impression, a mouse hover associated with a provided digital impression, a scroll-pause associated with a provided digital impression, an un-mute associated with a provided digital impression, and other signals indicating that a user has viewed a provided digital impression (e.g., eye tracking information, gyroscopic information). In response to detecting any of these activities, the impression manager 202 can determine that the provided digital impression has been interacted with.

More specifically, the impression manager 202 identifies "view-through" activities associated with a digital impression. For example, the impression manager 202 identifies a scroll-stop or scroll-pause associated with a networking system user's newsfeed where the digital impression is in the display of the newsfeed for a threshold amount of time. In response to identifying this activity and in the absence of any click-through activities (e.g., a tap touch gesture, a mouse click, a track pad interaction), the impression manager 202 can determine that a view-through activity has occurred in associated with the digital impression.

In response to determining that a provided digital impression has been viewed but not clicked on, the impression manager 202 begins an attribution window associated with that digital impression. For example, as discussed above, non-click-through interactions with a digital impression may or may not eventually result in a conversion. Unlike click interactions with a digital impression that result in a user being redirected to a target website, other interactions such as views of the digital impression do not generally result in a series of user actions that can be tracked. Due to storage and processing limitations, the optimization system 100 cannot wait indefinitely for an eventual conversion that results from a user simply viewing, but not clicking on a digital impression. Accordingly, in one or more embodiments, the impression manager 202 only attributes a conversion to the viewing of a digital impression when both the viewing and the conversion occur within a threshold period of time. As mentioned above, this threshold period of time is the attribution window associated with the viewed digital impression, and the conversion is noted as a view-through conversion.

As such, in response to determining that a user has viewed a particular digital impression (e.g., the user's scroll position has stopped such that the digital impression is displayed for a threshold amount of time), the impression manager 202 begins the attribution window associated with that instance of the digital impression. In one or more embodiments, the attribution window can be specified as part of the campaign information received from the third-party system 114. For example, the conversion optimization manager 106 can increase the campaign costs proportionally to the length of the attribution window (e.g., because the conversion optimization manager 106 has to store information for longer periods of time when the attribution window is longer). Additionally or alternatively, the impression manager 202 can scale the attribution window for a particular digital impression based on current available storage volume (e.g., if more storage is currently available, the attribution window is longer, and vice versa). Additionally or alternatively, the impression manager 202 can set the attribution window to a predetermined default amount of time (e.g., two hours from when a digital impression is viewed until a detected conversion).

As mentioned above, and as illustrated in FIG. 2, the conversion optimization manager 106 includes the vector generator 204. In one or more embodiments, as will be described in greater detail below, a machine learning model is trained over time with generated vectors to accurately predict whether providing a digital impression to a particular networking system user will result in a conversion. Accordingly, in response to a detected interaction with a digital impression provided to a networking system user, the vector generator 204 generates a vector associated with the detected interaction with that digital impression for use in training the machine learning model.

In particular, the vector generator 204 generates a vector that is specific to the digital impression, the networking system user, and the context within which the digital impression was provided to that networking system user. For example, the vector generator 204 identifies features associated with the digital impression, features associated with the networking system user, and features associated with the context of the digital impression. In one or more embodiments, features associated with the digital impression include the campaign and ad set associated with the digital impression, the campaign objectives associated with the digital impression, the demographic objectives associated with the digital impression, an insertion point in the newsfeed associated with the digital impression, the text and media associated with the digital impression, and the URL associated with the digital impression. In one or more embodiments, features associated with the networking system user include the unique networking system identifier associated with the networking system user, demographic information associated with the networking system user, and a number of times the digital impression has been provided to the networking system user. In one or more embodiments, features associated with the context of the digital impression include a device type where the user viewed the digital impression (e.g., smart phone, tablet, laptop), the date and time of day when the digital impression was provided to the networking system user, and the date and time of day when the user interacted with the digital impression (e.g., viewed the digital impression, clicked on the digital impression).

In one or more embodiments, in response generating a vector including the attributes described above, the vector generator 204 additionally identifies dense features and sparse features to include in the generated vector. For example, in at least one embodiment, the vector generator 204 identifies dense features including, but not limited to, user-specific conversion information, third-party-specific conversion information, and demographic-specific conversion information. Additionally, in at least one embodiment, the vector generator 204 identifies sparse features including, but not limited to, networking system information associated with the networking system user who interacted with the digital impression. This networking system information can include networking system posts and pages the user has "liked," third-parties with whom the user has previously engaged with via the networking system, and comments and tags submitted by the networking system user.

In one or more embodiments, the vector generator 204 generates a vector including the identified dense and sparse features along with a unique identifier associated with the networking system user who interacted with the digital impression, a unique identifier associated with the third-party sponsoring the digital impression (e.g., the business associated with the third-party system 114), and information associated with the context of the interaction. As mentioned above, the contextual information can include the device type of the computing device (e.g., the client-computing device 108a) where the networking system user interacted with digital impression, and the date and time when the networking system user interacted with the digital impression. In at least one embodiment, the vector generator 204 also includes information in the vector that defines the actions that constitute a successful conversion (e.g., a purchase of a particular product, a download of a software application).

In one or more embodiments, the vector generator 204 stores the generated vector for the duration of the attribution window. If the conversion optimization manager 106 receives a conversion notification associated with the generated vector during the attribution window, the vector generator 204 sets a conversion field within the generated vector to "1." If the attribution window lapses with no received conversion notification, the vector generator 204 sets the conversion field within the generated vector to "0." Following the end of the attribution window, and in one or more embodiments as will be described in greater detail below, the vector generator 204 provides the generated vector to the model manager 208 for use in training the machine learning model.

In addition to a generating vector in response to a detected interaction with a digital impression, the vector generator 204 also generates vectors prior to a digital impression being provided to one or more networking system users. As mentioned above, a trained machine learning model can accurately predict whether providing a digital impression to a particular networking system user will lead to activities that constitute a conversion. Accordingly, in response to the impression manager 202 identifying one or more networking system users who correspond with various target campaign demographics, the vector generator 204 generates a vector associated with each identified networking system user and provides the generated vectors to the model manager 208 to use as inputs into the trained machine learning model. The impression manager 202 can then provide the digital impression to one or more of the identified networking system users based on the predictive outputs of the trained machine learning model.

In one or more embodiments, the vector generator 204 generates the vectors associated with the identified networking system users to include features the digital impression, features of an identified networking system user, and features associated with the context in which the impression manager 202 will provide the digital impression. In at least one embodiment, the vector generator 204 also identifies and includes dense and sparse features, as discussed above.

As mentioned above, and as shown in FIG. 2, the conversion optimization manager 106 includes the conversion engine 206. In one or more embodiments, the conversion engine 206 receives conversion information in a variety of ways, and determines whether a conversion associated with a particular digital impression has occurred. For example, as described above, a view-through conversion occurs when a networking system user views a digital impression (e.g., without clicking on the digital impression), and then performs the actions necessary for a conversion to occur (e.g., completes an online purchase, successfully installs a piece of software) during the attribution window.

In general, the conversion occurs on a system that is separate from the networking system 104 (e.g., the third-party system 114). Thus, in one or more embodiments, the conversion engine 206 receives conversion information from the third-party system 114 as part of a system call (e.g., an API call), that is triggered by a web page tracking pixel, a web browser plugin, or other similar mechanism. For example, when the networking system user visits a web site and makes a purchase, the purchase confirmation web page can include a tracking pixel that executes an API call that sends conversion information to the conversion engine 206. The conversion information can include the unique identifier associated with the networking system user, the unique identifier associated with the business providing the web page, and other information defining the conversion event (e.g., an item purchased, time spent on a particular web page, the date and time of the conversion).

In at least one embodiment, a conversion can occur outside a network environment. For example, in one embodiment, a conversion occurs when a user downloads and installs a piece of software on a mobile phone. In that embodiment, the conversion engine 206 can receive conversion information in response to a software system call (e.g., a SDK call) executed by an installed software application. For instance, the conversion information received in this manner can include the unique identifier associated with the networking system user, the unique identifier associated with the business providing the web page, and information about the installation of the software application (e.g., the type of device on which the software was installed, the date and time of the installation).

Furthermore, in at least one embodiment, a conversion can occur in a "real-world" setting. For example, a view-through conversion can occur when a networking system user purchases a product at a brick-and-mortar store after viewing a digital impression including a digital asset via the networking system 104. In that embodiment, the conversion engine 206 can receive conversion information from a third-party payment system at the point of sale. For instance, the conversion information can include a unique identifier associated with the networking system user (e.g., provided by the user at the point of sale), an identifier associated with the business or third-party, and information about the purchase (e.g., the product that was purchased, the date and time of day).

In response to receiving conversion information in one or more of the ways discussed above, the conversion engine 206 identifies a vector corresponding to the received conversion information and determines whether a successful conversion has occurred. For example, as described above, the vector generator 204 generates a vector associated with an interaction by a networking system user with a particular digital impression. The generated vector includes information including the networking system user's unique identifier, the unique identifier associated with the third-party sponsoring the digital impression, and information defining the actions required for a successful conversion. Accordingly, in one or more embodiments, the conversion engine 206 identifies a generated vector that corresponds to the received conversion information by matching one or more of the networking system user's unique identifier, or the unique identifier associated with the third-party sponsoring the digital impression.

In at least one embodiment, the conversion engine 206 then determines if a successful conversion has occurred by analyzing the received conversion information in light of the conversion definition included in the identified vector and the determined attribute window. The conversion engine 206 provides the results of this determination (e.g., either a conversion has occurred or has not occurred) to the vector generator 204, such that the vector generator 204 can include in the generated vector whether the interaction with the digital impression associated with the vector resulted in a conversion.

As mentioned above, and as shown in FIG. 2, the conversion optimization manager 106 also includes the model manager 208. In one or more embodiments, the model manager 208 builds and continually trains one or more machine learning models. For example, as described above, the optimization system 100 utilizes machine learning models to determine a likelihood of whether providing a digital impression to a particular user will result in a conversion. The end goal of the training a machine learning model being to improve the conversion rates associated with click-through user actions as well as with view-through user actions.

In one or more embodiments, the model manager 208 can build a machine learning model associated with a particular campaign. In that embodiment, the model manager 208 trains the machine learning model with vectors associated with all the digital impressions associated with that particular campaign. For example, the model manager 208 utilizes the vector as input into the machine learning model and the conversion information (e.g., "1" for successful conversion, "0" for no conversion) as the desired output. In one or more embodiments, the model manager 208 then utilizes feed-forward backpropagation techniques utilizing one or more generated vectors and the associated conversion information to train the machine learning model until the output of the machine learning model for a given training vector matches the conversion information associated with that vector.

In additional or alternative embodiments, the model manager 208 can build a machine learning model associated with an ad set including multiple digital impressions, or associated with a campaign including multiple ad sets, each including multiple digital impressions. In at least one embodiment, the model manager 208 configures the machine learning model according to the objectives set out by the business looking to increase their conversion rates (e.g., the business associated with the third-party system 114). Regardless of how a machine learning model is built, the model manager 208 can train the machine learning model utilizing feed-forward backpropagation as described above. Alternatively, the model manager 208 can train the machine learning model in any appropriate manner.

In one or more embodiments, the model manager 208 builds a machine learning model to determine a probability represented as:

$$P(conv/imp) = P(conv=1, click=1/imp) + P(conv=1, click=0/imp)$$

Where: P(conv/imp) is the probability that providing a digital impression to a particular user will result in a conversion; P(conv=1, click=1/imp) is the probability that a click on a provided digital impression will result in a conversion; and P(conv=1, click=0/imp) is the probability that a non-click on the provided digital impression (e.g., only viewing the provided digital impression) will result in a conversion.

Once the model manager 208 builds and trains the machine learning model, the model manager 208 can utilize the machine learning model to predict whether providing a digital impression will result in conversion. As described above, the vector generator 204 generates a vector corresponding to an identified networking system user to whom a particular digital impression may be provided. The impression manager 202 may eventually provide the digital impression to an identified networking system user if the machine learning model predicts that providing the digital impression to that user will result in a conversion. Accordingly, in response to receiving a vector unassociated with any conversion information, the model manager 208 provides the vector to the machine learning model as input, and then reports the output of the machine learning model (e.g., either a "1" for likely conversion or a "0" for unlikely conversion) to the impression manager 202.

As shown in FIG. 2, and as mentioned above, the conversion optimization manager 106 also includes the data storage 210 including model data 212 and impression data 214. In one or more embodiments, model data 212 is representative of machine learning model information, such as described herein. Additionally in one or more embodiments, impression data is representative of digital impression information, such as described herein.

Figure 3:
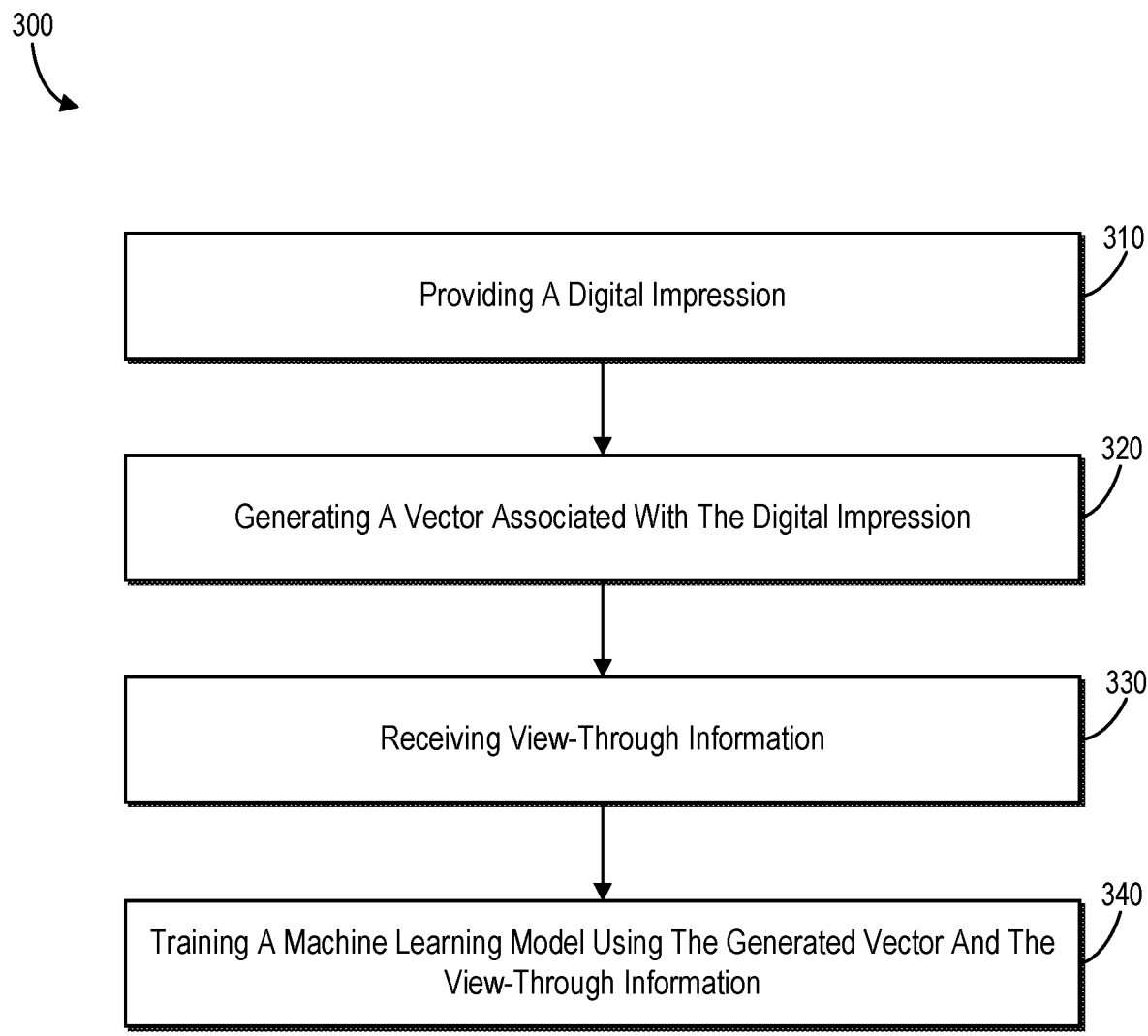
FIG. 3 illustrates a flowchart of a series of acts in a method of optimizing a view-through conversion rate in accordance with one or more embodiments.

Turning now to FIG. 3, this figure illustrates a flowchart of a series of acts 300 of training a machine learning model to predict view-through conversion rates. While FIG. 3 illustrates acts according to one embodiment, alternative embodiments may omit, add to, reorder, and/or modify any of the acts shown in FIG. 3. The acts of FIG. 3 can be performed as part of a method. Alternatively, a non-transitory computer readable-medium can comprise instructions, that when executed by one or more processor, cause a computing device to perform the acts of FIG. 3. In still further embodiments, a system can perform the acts of FIG. 3.

As shown in FIG. 3, the series of acts 300 includes an act 310 of providing a digital impression. For example, the act 310 can involve providing a digital impression to a networking system user. For instance, in one or more embodiments, providing the digital impression to the networking system user is in response to identifying the networking system user as an appropriate recipient of the digital impression. In at least one embodiment, identifying the networking system user as an appropriate recipient of the digital impression includes: receiving campaign demographic objectives from a campaign owner; analyzing networking system user information for each of a plurality of networking system users to identify correlations between the received campaign demographic objectives and the networking system user information; and receiving a prediction from the machine learning model based on each of the identified correlations as to whether an associated networking system user is an appropriate recipient of the digital impression.

The series of acts 300 further includes an act 320 of generating a vector associated with the digital impression. For example, the act 320 can involve generating a vector associated with the digital impression comprising a plurality of features, the plurality of features comprising at least one of: one or more features associated with the digital impression, one or more features associated with the networking system user, or one or more features associated with a context of the digital impression. In one or more embodiments, the one or more features associated with the digital impression comprises one or more of a campaign and ad set associated with the digital impression, campaign objectives associated with the digital impression, demographic objectives associated with the digital impression, an insertion point in the newsfeed associated with the digital impression, text and media associated with the digital impression, or a URL associated with the digital impression. Additionally, in one or more embodiments, the one or more features associated with the networking system user comprises one or more of a unique networking system identifier associated with the networking system user, demographic information associated with the networking system user, or a number of times the digital impression has been provided to the networking system user. Further, in one or more embodiments, the one or more features associated with the context of the digital impression comprises one or more of a device type where the user viewed the digital impression, a date and time of day when the digital impression was provided to the networking system user, a date and time of day when the user viewed the digital impression, or a date and time of day when the user clicked on the digital impression.

Furthermore, in at least one embodiment, generating the vector associated with the digital impression further includes: identifying dense features comprising one or more of user-specific conversion information, third-party-specific conversion information, or demographic-specific conversion information; identifying sparse features comprising networking system information associated with the networking system user who interacted with the digital impression; and adding the dense features and the sparse features to the generated vector. Additionally, in one or more embodiments, generating the vector associated with the digital impression is in response to detecting an interaction with the digital impression. For example, detecting the interaction with the digital impression includes one or more of detecting a click associated with the digital impression, detecting a scroll stop associated with the digital impression, detecting eye movement associated with the digital impression, or detecting networking system activity associated with the digital impression.

As shown in FIG. 3, the series of acts 300 also include an act 330 of receiving view-through information. For example, the act 330 can involve receiving, within an attribution window, view-through conversion information associated with the digital impression. For instance, in one or more embodiments, receiving view-through conversion information associated with the digital impression includes receiving a system call including view-through conversion information that includes an indication of a successful conversion. In at least one embodiment, the acts 300 further include, in response to detecting the interaction with the digital impression, beginning the attribution window in association with the digital impression. In one or more embodiments, the series of acts 300 further include determining, at the end of the attribution window, that no view-through conversion information associated with the digital impression has been received; associating the generated vector with an unsuccessful view-through conversion; and training the machine learning model utilizing the generated vector and the unsuccessful view-through conversion to predict additional view-through conversions.

As shown in FIG. 3, the series of acts 300 also include an act 340 of training a machine learning model using the generated vector and the view-through information. For example, the act 340 can involve training a machine learning model utilizing the generated vector and the received view-through conversion information to predict additional view-through conversions. In one or more embodiments, training the machine learning model utilizing the generated vector and the received view-through conversion information to predict additional view-through conversions comprises utilizing feed-forward backpropagation techniques associated with the machine learning model with the generated vector as inputs into the machine learning model and the received view-through conversion information as a desired output from the machine learning model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 4:
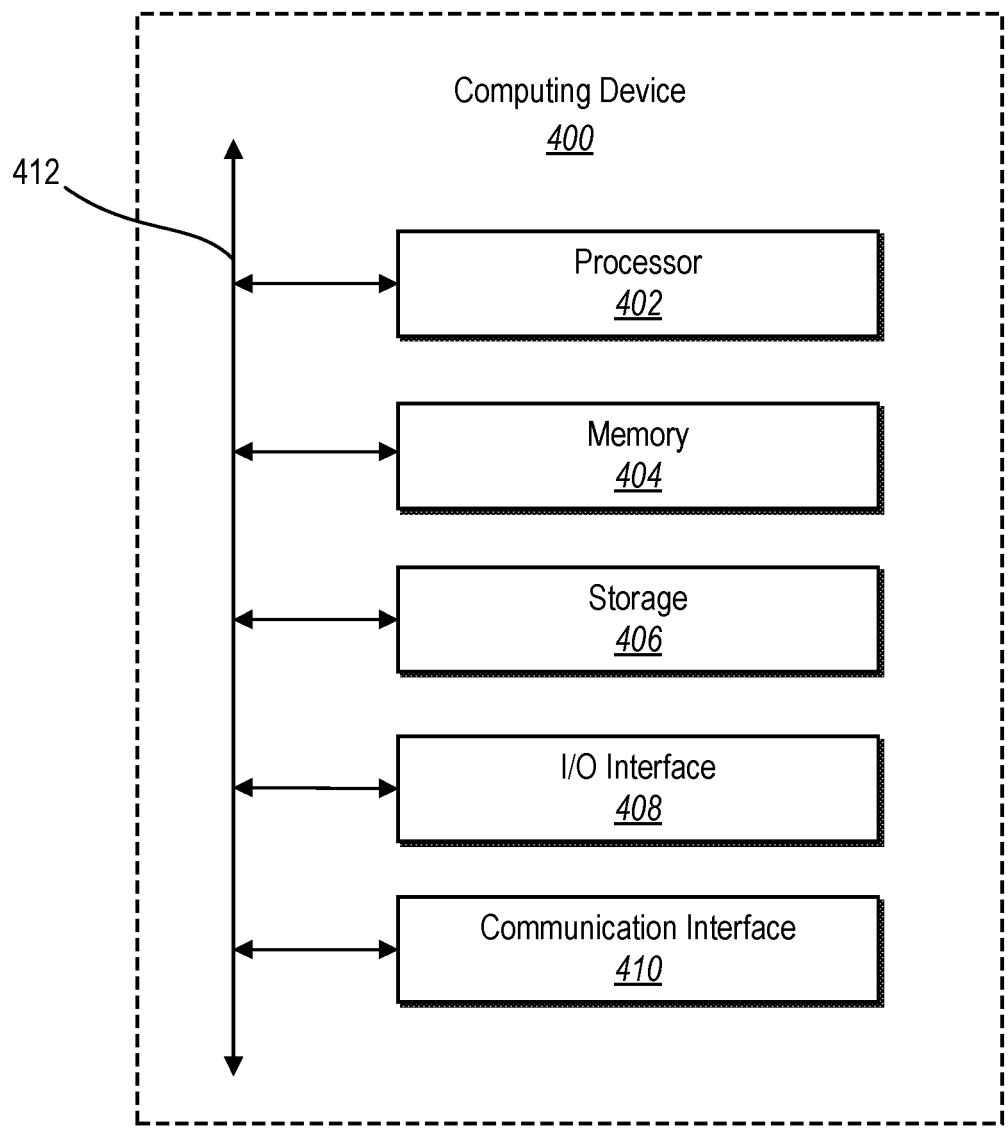
FIG. 4 illustrates a block diagram of an exemplary computing device in accordance with one or more embodiments.

FIG. 4 illustrates a block diagram of exemplary computing device 400 that may be configured to perform one or more of the processes described above. One will appreciate that one or more computing devices such as the computing device 400 may implement the optimization system 100. As shown by FIG. 4, the computing device 400 can comprise a processor 402, a memory 404, a storage device 406, an I/O interface 408, and a communication interface 410, which may be communicatively coupled by way of a communication infrastructure 412. While an exemplary computing device 400 is shown in FIG. 4, the components illustrated in FIG. 4 are not intended to be limiting. Additional or alternative components may be used in other embodiments. Furthermore, in certain embodiments, the computing device 400 can include fewer components than those shown in FIG. 4. Components of the computing device 400 shown in FIG. 4 will now be described in additional detail.

In one or more embodiments, the processor 402 includes hardware for executing instructions, such as those making up a computer program. As an example and not by way of limitation, to execute instructions, the processor 402 may retrieve (or fetch) the instructions from an internal register, an internal cache, the memory 404, or the storage device 406 and decode and execute them. In one or more embodiments, the processor 402 may include one or more internal caches for data, instructions, or addresses. As an example and not by way of limitation, the processor 402 may include one or more instruction caches, one or more data caches, and one or more translation lookaside buffers (TLBs). Instructions in the instruction caches may be copies of instructions in the memory 404 or the storage device 406.

The memory 404 may be used for storing data, metadata, and programs for execution by the processor(s). The memory 404 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 404 may be internal or distributed memory.

The storage device 406 includes storage for storing data or instructions. As an example and not by way of limitation, storage device 406 can comprise a non-transitory storage medium described above. The storage device 406 may include a hard disk drive (HDD), a floppy disk drive, flash memory, an optical disc, a magneto-optical disc, magnetic tape, or a Universal Serial Bus (USB) drive or a combination of two or more of these. The storage device 406 may include removable or non-removable (or fixed) media, where appropriate. The storage device 406 may be internal or external to the computing device 400. In one or more embodiments, the storage device 406 is non-volatile, solid-state memory. In other embodiments, the storage device 406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 408 allows a user to provide input to, receive output from, and otherwise transfer data to and receive data from computing device 400. The I/O interface 408 may include a mouse, a keypad or a keyboard, a touch screen, a camera, an optical scanner, network interface, modem, other known I/O devices or a combination of such I/O interfaces. The I/O interface 408 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 408 is configured to provide graphical data to a display for presentation to a user. The graphical data may be representative of one or more graphical user interfaces and/or any other graphical content as may serve a particular implementation.

The communication interface 410 can include hardware, software, or both. In any event, the communication interface 410 can provide one or more interfaces for communication (such as, for example, packet-based communication) between the computing device 400 and one or more other computing devices or networks. As an example and not by way of limitation, the communication interface 410 may include a network interface controller (MC) or network adapter for communicating with an Ethernet or other wirebased network or a wireless NIC (WNIC) or wireless adapter for communicating with a wireless network, such as a WI-FI.

Additionally or alternatively, the communication interface 410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 410 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 412 may include hardware, software, or both that couples components of the computing device 400 to each other. As an example and not by way of limitation, the communication infrastructure 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the optimization system 100 can comprise a social networking system (e.g., the networking system 108 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 5:
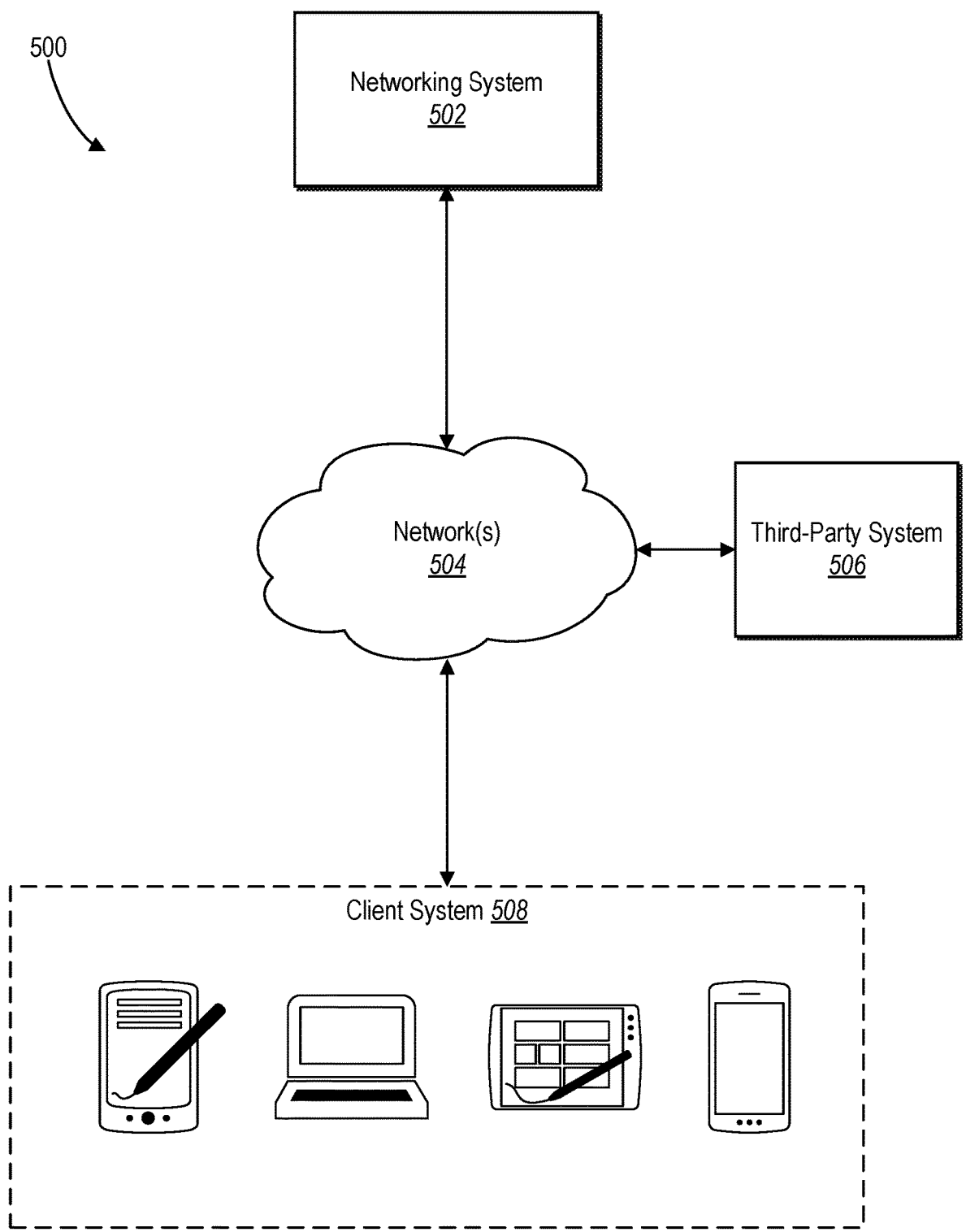
FIG. 5 is an example network environment of a networking system in accordance with one or more embodiments.

FIG. 5 illustrates an example network environment 500 of a social networking system. Network environment 500 includes a client device 506, a networking system 502 (e.g., a social networking system and/or an electronic messaging system), and a third-party system 508 connected to each other by a network 504. Although FIG. 5 illustrates a particular arrangement of client device 506, networking system 502, third-party system 508, and network 504, this disclosure contemplates any suitable arrangement of client device 506, networking system 502, third-party system 508, and network 504. As an example and not by way of limitation, two or more of client device 506, networking system 502, and third-party system 508 may be connected to each other directly, bypassing network 504. As another example, two or more of client device 506, networking system 502, and third-party system 508 may be physically or logically co-located with each other in whole or in part. Moreover, although FIG. 5 illustrates a particular number of client devices 506, networking systems 502, third-party systems 508, and networks 504, this disclosure contemplates any suitable number of client devices 506, networking systems 502, third-party systems 508, and networks 504. As an example and not by way of limitation, network environment 500 may include multiple client device 506, networking systems 502, third-party systems 508, and networks 504.

This disclosure contemplates any suitable network 504. As an example and not by way of limitation, one or more portions of network 504 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 504 may include one or more networks 504.

Links may connect client device 506, networking system 502, and third-party system 508 to communication network 504 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 500. One or more first links may differ in one or more respects from one or more second links.

In particular embodiments, client device 506 may be an electronic device including hardware, software, or embedded logic components or a combination of two or more such components and capable of carrying out the appropriate functionalities implemented or supported by client device 506. As an example and not by way of limitation, a client device 506 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 506. A client device 506 may enable a network user at client device 506 to access network 504. A client device 506 may enable its user to communicate with other users at other client devices 506.

In particular embodiments, client device 506 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 506 may enter a Uniform Resource Locator (URL) or other address directing the web browser to a particular server (such as server, or a server associated with a third-party system 508), and the web browser may generate a Hyper Text Transfer Protocol (HTTP) request and communicate the HTTP request to server. The server may accept the HTTP request and communicate to client device 506 one or more Hyper Text Markup Language (HTML) files responsive to the HTTP request. Client device 506 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 502 may be a network-addressable computing system that can host an online social network. Networking system 502 may generate, store, receive, and send social-networking data, such as, for example, user-profile data, concept-profile data, social-graph information, or other suitable data related to the online social network. Networking system 502 may be accessed by the other components of network environment 500 either directly or via network 504. In particular embodiments, networking system 502 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 502 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 506, a networking system 502, or a third-party system 508 to manage, retrieve, modify, add, or delete, the information stored in data store.

In particular embodiments, networking system 502 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 502 may provide users of the online social network the ability to communicate and interact with other users. In particular embodiments, users may join the online social network via networking system 502 and then add connections (e.g., relationships) to a number of other users of networking system 502 that they want to be connected to. Herein, the term "friend" may refer to any other user of networking system 502 with whom a user has formed a connection, association, or relationship via networking system 502.

In particular embodiments, networking system 502 may provide users with the ability to take actions on various types of items or objects, supported by networking system 502. As an example and not by way of limitation, the items and objects may include groups or social networks to which users of networking system 502 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 502 or by an external system of third-party system 508, which is separate from networking system 502 and coupled to networking system 502 via a network 504.

In particular embodiments, networking system 502 may be capable of linking a variety of entities. As an example and not by way of limitation, networking system 502 may enable users to interact with each other as well as receive content from third-party systems 508 or other entities, or to allow users to interact with these entities through an application programming interfaces (API) or other communication channels.

In particular embodiments, a third-party system 508 may include one or more types of servers, one or more data stores, one or more interfaces, including but not limited to APIs, one or more web services, one or more content sources, one or more networks, or any other suitable components, e.g., that servers may communicate with. A third-party system 508 may be operated by a different entity from an entity operating networking system 502. In particular embodiments, however, networking system 502 and third-party systems 508 may operate in conjunction with each other to provide social-networking services to users of networking system 502 or third-party systems 508. In this sense, networking system 502 may provide a platform, or backbone, which other systems, such as third-party systems 508, may use to provide social-networking services and functionality to users across the Internet.

In particular embodiments, a third-party system 508 may include a third-party content object provider. A third-party content object provider may include one or more sources of content objects, which may be communicated to a client device 506. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 502 also includes user-generated content objects, which may enhance a user's interactions with networking system 502. User-generated content may include anything a user can add, upload, send, or "post" to networking system 502. As an example and not by way of limitation, a user communicates posts to networking system 502 from a client device 506. Posts may include data such as status updates or other textual data, location information, photos, videos, links, music or other similar data or media. Content may also be added to networking system 502 by a third-party through a "communication channel," such as a newsfeed or stream.

In particular embodiments, networking system 502 may include a variety of servers, sub-systems, programs, modules, logs, and data stores. In particular embodiments, networking system 502 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 502 may also include suitable components such as network interfaces, security mechanisms, load balancers, failover servers, management-and-network-operations consoles, other suitable components, or any suitable combination thereof. In particular embodiments, networking system 502 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 502 to one or more client devices 506 or one or more third-party system 508 via network 504. The web server may include a mail server or other messaging functionality for receiving and routing messages between networking system 502 and one or more client devices 506. An API-request server may allow a third-party system 508 to access information from networking system 502 by calling one or more APIs. An action logger may be used to receive communications from a web server about a user's actions on or off networking system 502. In conjunction with the action log, a third-party-content-object log may be maintained of user exposures to third-party-content objects. A notification controller may provide information regarding content objects to a client device 506. Information may be pushed to a client device 506 as notifications, or information may be pulled from client device 506 responsive to a request received from client device 506. Authorization servers may be used to enforce one or more privacy settings of the users of networking system 502. A privacy setting of a user determines how particular information associated with a user can be shared. The authorization server may allow users to opt in to or opt out of having their actions logged by networking system 502 or shared with other systems (e.g., third-party system 508), such as, for example, by setting appropriate privacy settings. Third-party-content-object stores may be used to store content objects received from third parties, such as a third-party system 508. Location stores may be used for storing location information received from client devices 506 associated with users. Advertisement-pricing modules may combine social information, the current time, location information, or other suitable information to provide relevant advertisements, in the form of notifications, to a user.

Figure 6:
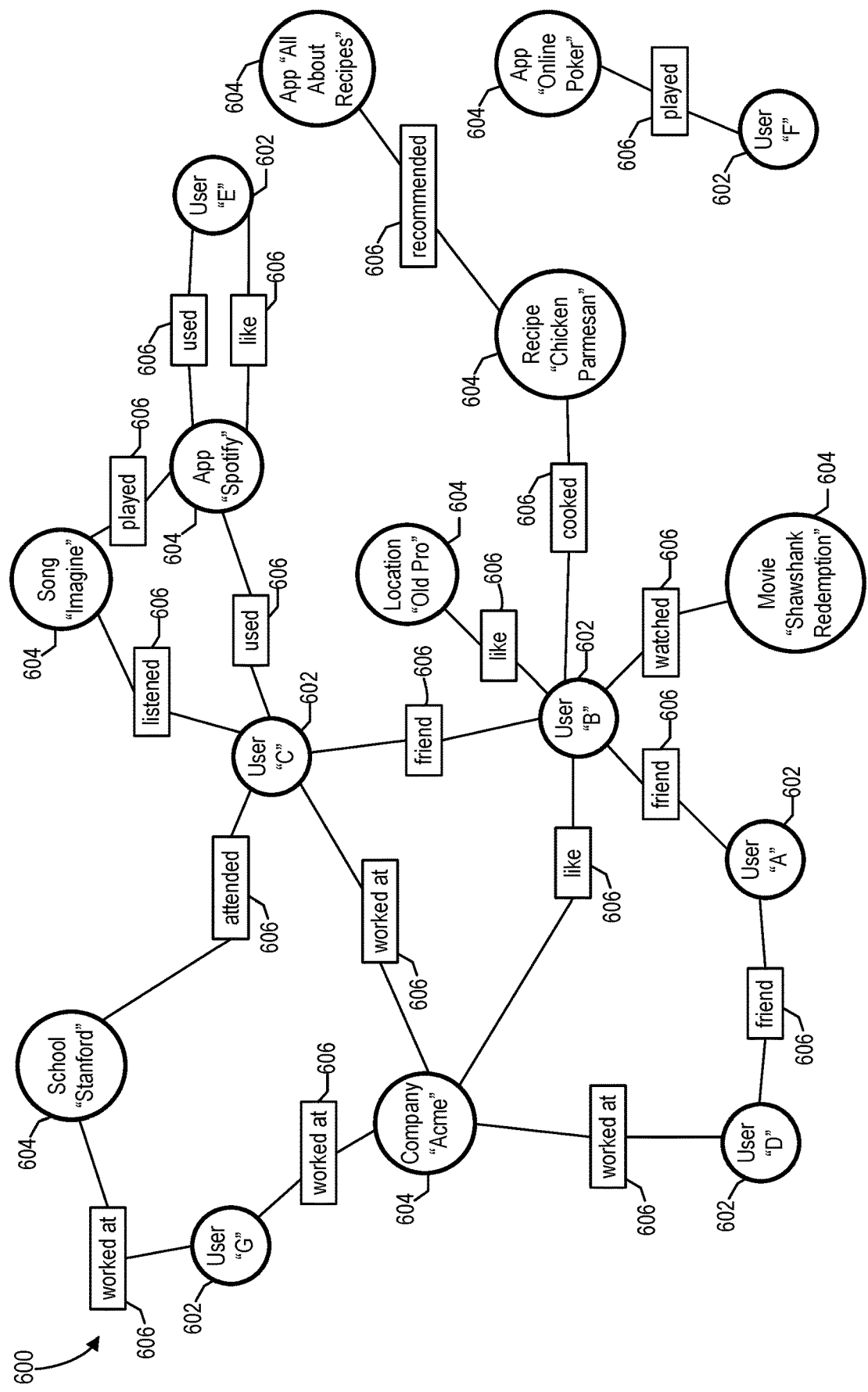
FIG. 6 illustrates a social graph in accordance with one or more embodiments.

FIG. 6 illustrates example social graph 600. In particular embodiments, networking system 502 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a networking system 502, client device 506, or third-party system 508 may access social graph 600 and related social-graph information for suitable applications. The nodes and edges of social graph 600 may be stored as data objects, for example, in a data store (such as a social-graph database). Such a data store may include one or more searchable or query able indexes of nodes or edges of social graph 600.

In particular embodiments, a user node 602 may correspond to a user of networking system 502. As an example and not by way of limitation, a user may be an individual (human user), an entity (e.g., an enterprise, business, or third-party application), or a group (e.g., of individuals or entities) that interacts or communicates with or over networking system 502. In particular embodiments, when a user registers for an account with networking system 502, networking system 502 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with networking system 502. In particular embodiments, a user node 602 may be associated with information provided by a user or information gathered by various systems, including networking system 502. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with networking system 502 or a third-party website associated with a web-application server); an entity (such as, for example, a person, business, group, sports team, or celebrity); a resource (such as, for example, an audio file, video file, digital photo, text file, structured document, or application) which may be located within networking system 502 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 604 may be associated with information of a concept provided by a user or information gathered by various systems, including networking system 502. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to networking system 502. Profile pages may also be hosted on third-party websites associated with a third-party system 508. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 508. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 506 to send to networking system 502 a message indicating the user's action. In response to the message, networking system 502 may create an edge (e.g., an "eat" edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, networking system 502 may send a "friend request" to the second user. If the second user confirms the "friend request," networking system 502 may create an edge 606 connecting the first user's user node 602 to the second user's user node 602 in social graph 600 and store edge 606 as social-graph information in one or more data stores. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, networking system 502 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 502 may create a "listened" edge 606 and a "used" edge (as illustrated in FIG. 6) between user nodes 602 corresponding to the user and concept nodes 604 corresponding to the song and application to indicate that the user listened to the song and used the application. Moreover, networking system 502 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, networking system 502 may create an edge 606 between a user node 602 and a concept node 604 in social graph 600. As an example and not by way of limitation, a user viewing a concept-profile page (such as, for example, by using a web browser or a special-purpose application hosted by the user's client device 506) may indicate that he or she likes the concept represented by the concept node 604 by clicking or selecting a "Like" icon, which may cause the user's client device 506 to send to networking system 502 a message indicating the user's liking of the concept associated with the concept-profile page. In response to the message, networking system 502 may create an edge 606 between user node 602 associated with the user and concept node 604, as illustrated by "like" edge 606 between the user and concept node 604. In particular embodiments, networking system 502 may store an edge 606 in one or more data stores. In particular embodiments, an edge 606 may be automatically formed by networking system 502 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 502). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 502 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 502) or RSVP (e.g., through networking system 502) to an event associated with the advertisement. In addition or as an alternative, an advertisement may include social-networking-system context directed to the user. As an example and not by way of limitation, an advertisement may display information about a friend of the user within networking system 502 who has taken an action associated with the subject matter of the advertisement.

In particular embodiments, networking system 502 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 508 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 502 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 502 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 502 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 502 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 502 may calculate a coefficient based on a user's actions. Networking system 502 may monitor such actions on the online social network, on a third-party system 508, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 502 may calculate a coefficient based on the user's actions with particular types of content. The content may be associated with the online social network, a third-party system 508, or another suitable system. The content may include users, profile pages, posts, news stories, headlines, instant messages, chat room conversations, emails, advertisements, pictures, video, music, other suitable objects, or any combination thereof. Networking system 502 may analyze a user's actions to determine whether one or more of the actions indicate an affinity for subject matter, content, other users, and so forth. As an example and not by way of limitation, if a user may make frequently posts content related to "coffee" or variants thereof, networking system 502 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 502 may calculate a coefficient based on the type of relationship between particular objects. Referencing the social graph 600, networking system 502 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user node 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 502 may determine that the user has a higher coefficient with respect to the first photo than the second photo because having a tagged-in-type relationship with content may be assigned a higher weight and/or rating than having a like-type relationship with content. In particular embodiments, networking system 502 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 502 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, networking system 502 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 506 of the user). A first user may be more interested in other users or concepts that are closer to the first user. As an example and not by way of limitation, if a user is one mile from an airport and two miles from a gas station, networking system 502 may determine that the user has a higher coefficient for the airport than the gas station based on the proximity of the airport to the user.

In particular embodiments, networking system 502 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 502 may provide information that is relevant to user's interests and current circumstances, increasing the likelihood that they will find such information of interest. In particular embodiments, networking system 502 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 502 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 502 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 508 (e.g., via an API or other communication channel), or from another suitable system. In response to the request, networking system 502 may calculate the coefficient (or access the coefficient information if it has previously been calculated and stored). In particular embodiments, networking system 502 may measure an affinity with respect to a particular process. Different processes (both internal and external to the online social network) may request a coefficient for a particular object or set of objects. Networking system 502 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by networking system 502 or shared with other systems (e.g., third-party system 508). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 508, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 502 may send a request to the data store for the object. The request may identify the user associated with the request and may only be sent to the user (or a client device 506 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   providing a digital impression to a first networking system user;
   detecting the first networking system user viewing the digital impression without clicking on the digital impression by detecting one or more of: a scroll stop associated with the digital impression, eye movement associated with the digital impression, or networking system activity associated with the digital impression;
   generating, in response to detecting the first networking system user viewing the digital impression without clicking on the digital impression, a first vector to train a machine learning model to optimize delivery of future digital impressions, the first vector comprising a plurality of features, the plurality of features comprising at least one of: one or more features associated with the digital impression, one or more features associated with the first networking system user, or one or more features associated with a context of the digital impression;
   in response to generating the first vector, initializing an attribution window representing a predetermined amount of time beginning with generating the first vector;
   receiving, within the attribution window, view-through conversion information indicating whether a conversion resulted from the first networking system user and the digital impression without clicking on the digital impression;
   training the machine learning model utilizing the generated first vector and the received view-through conversion information to predict additional view-through conversions,
   identifying a second networking system user that corresponds to a target campaign demographic associated with the digital impression;
   generating a second vector associated with the second networking system user and the digital impression;
   generating, utilizing the machine learning model, a prediction of whether providing the digital impression to the second networking system user will result in a conversion; and
   providing the digital impression to the second networking system user based on the generated prediction.

2. The method as recited in claim 1, wherein providing the digital impression to the first networking system user is in response to identifying the first networking system user as an appropriate recipient of the digital impression.

3. The method as recited in claim 2, wherein identifying the first networking system user as an appropriate recipient of the digital impression comprises:
   receiving campaign demographic objectives from a campaign owner;
   analyzing networking system user information for each of a plurality of networking system users to identify correlations between the received campaign demographic objectives and the networking system user information; and
   receiving a prediction from the machine learning model based on each of the identified correlations as to whether an associated networking system user is an appropriate recipient of the digital impression.

4. The method as recited in claim 1, wherein:
   the one or more features associated with the digital impression comprise one or more of a campaign and ad set associated with the digital impression, campaign objectives associated with the digital impression, demographic objectives associated with the digital impression, an insertion point in a newsfeed associated with the digital impression, text and media associated with the digital impression, or a URL associated with the digital impression;
   the one or more features associated with the first networking system user comprise one or more of a unique networking system identifier associated with the first networking system user, demographic information associated with the first networking system user, or a number of times the digital impression has been provided to the first networking system user; and
   the one or more features associated with the context of the digital impression comprise one or more of a device type where the first networking system user viewed the digital impression, a date and time of day when the digital impression was provided to the first networking system user, a date and time of day when the first networking system user viewed the digital impression, or a date and time of day when the first networking system user clicked on the digital impression.

5. The method as recited in claim 1, wherein generating, in response to detecting the first networking system user viewing the digital impression without clicking on the digital impression, the first vector to train the machine learning model to optimize delivery of future digital impressions further comprises:
   identifying dense features comprising one or more of user-specific conversion information, third-party-specific conversion information, or demographic-specific conversion information;
   identifying sparse features comprising networking system information associated with the first networking system user who viewed the digital impression without clicking on the digital impression; and
   adding the dense features and the sparse features to the generated first vector.

6. The method as recited in claim 4 wherein the attribution window is specified by the campaign associated with the digital impression.

7. The method as recited in claim 1, wherein receiving view-through conversion information indicating whether a conversion resulted from the first networking system user and the digital impression without clicking on the digital impression comprises receiving a system call including view-through conversion information that comprises an indication of a successful conversion within the predetermined amount of time beginning with generating the first vector.

8. The method as recited in claim 1, further comprising:
determining, at an end of the attribution window, that no view-through conversion information associated with the networking system user and the digital impression has been received;
associating the generated first vector with an unsuccessful view-through conversion; and
training the machine learning model utilizing the generated first vector and the unsuccessful view-through conversion to predict additional view-through conversions.

9. The method as recited in claim 1, wherein training the machine learning model utilizing the generated first vector and the received view-through conversion information to predict additional view-through conversions comprises utilizing feed-forward backpropagation techniques associated with the machine learning model with the generated first vector as inputs into the machine learning model and the received view-through conversion information as a desired output from the machine learning model.

10. A system comprising:
at least one processor; and
at least one non-transitory computer-readable storage medium storing instructions thereon that, when executed by the at least one processor, cause the system to:
provide a digital impression to a first networking system user;
detect the first networking system user viewing the digital impression without clicking on the digital impression by detecting one or more of: a scroll stop associated with the digital impression, eye movement associated with the digital impression, or networking system activity associated with the digital impression;
generate, in response to detecting the first networking system user viewing the digital impression without clicking on the digital impression, a first vector to train a machine learning model to optimize delivery of future digital impressions, the first vector comprising a plurality of features, the plurality of features comprising at least one of: one or more features associated with the digital impression, one or more features associated with the first networking system user, or one or more features associated with a context of the digital impression;
in response to generating the first vector, initialize an attribution window representing a predetermined amount of time beginning with generating the first vector;
receive, within the attribution window, view-through conversion information indicating whether a conversion resulted from the first networking system user and the digital impression without clicking on the digital impression;
train the machine learning model utilizing the generated first vector and the received view-through conversion information to predict additional view-through conversions;
identify a second networking system user that corresponds to a target campaign demographic associated with the digital impression;
generate a second vector associated with the second networking system user and the digital impression;
generate, utilizing the machine learning model, a prediction of whether providing the digital impression to the second networking system user will result in a conversion; and
provide the digital impression to the second networking system user based on the generated prediction.

11. The system as recited in claim 10, wherein providing the digital impression to the first networking system user is in response to identifying the first networking system user as an appropriate recipient of the digital impression.

12. The system as recited in claim 11, wherein generating, in response to determining that the first networking system user viewed the digital impression without clicking on the digital impression, the first vector to train the machine learning model to optimize delivery of future digital impressions further comprises:
identifying dense features comprising one or more of user-specific conversion information, third-party-specific conversion information, or demographic-specific conversion information;
identifying sparse features comprising networking system information associated with the first networking system user who viewed the digital impression without clicking on the digital impression; and
adding the dense features and the sparse features to the generated first vector.

13. The system as recited in claim 10, further storing instructions that, when executed by the at least one processor, cause the system to determine the attribution window based on a campaign associated with the digital impression.

14. The system as recited in claim 13, wherein receiving view-through conversion information indicating whether a conversion resulted from the first networking system user and with the digital impression without clicking on the digital impression comprises receiving a system call including view-through conversion information that comprises an indication of a successful conversion within the predetermined amount of time beginning with generating the first vector.

15. The system as recited in claim 14, further storing instructions that, when executed by the at least one processor, cause the system to:
determining, at an end of the attribution window, that no view-through conversion information associated with the networking system user and the digital impression has been received;
associating the generated first vector with an unsuccessful view-through conversion; and
training the machine learning model utilizing the generated first vector and the unsuccessful view-through conversion to predict additional view-through conversions.

16. The system as recited in claim 15, wherein training the machine learning model utilizing the generated first vector and the received view-through conversion information to predict additional view-through conversions comprises utilizing feed-forward backpropagation techniques associated with the machine learning model with the generated first vector as inputs into the machine learning model and the received view-through conversion information as a desired output from the machine learning model.

17. A non-transitory computer-readable medium storing instructions thereon that, when executed by at least one processor, cause a computer system to:
provide a digital impression to a first networking system user;

detect the first networking system user viewing the digital impression without clicking on the digital impression by detecting one or more of: a scroll stop associated with the digital impression, eye movement associated with the digital impression, or networking system activity associated with the digital impression;

generate, in response to detecting the first networking system user viewing the digital impression without clicking on the digital impression, a first vector to train a machine learning model to optimize delivery of future digital impressions, the first vector comprising a plurality of features, the plurality of features comprising at least one of: one or more features associated with the digital impression, one or more features associated with the first networking system user, or one or more features associated with a context of the digital impression;

in response to generating the first vector, initialize an attribution window representing a predetermined amount of time beginning with generating the first vector;

receive, within the attribution window, view-through conversion information indicating whether a conversion resulted from the first networking system user and the digital impression without clicking on the digital impression;

train the machine learning model utilizing the generated first vector and the received view-through conversion information to predict additional view-through conversions, wherein training the machine learning model to predict additional view-through conversions comprises utilizing feed-forward backpropagation techniques associated with the machine learning model with the generated first vector as inputs into the machine learning model and the received view-through conversion information as a desired output from the machine learning model;

identify a second networking system user that corresponds to a target campaign demographic associated with the digital impression;

generate a second vector associated with the second networking system user and the digital impression;

generate, utilizing the machine learning model, a prediction of whether providing the digital impression to the second networking system user will result in a conversion; and provide the digital impression to the second networking system user based on the generated prediction.

18. The non-transitory computer-readable medium as recited in claim 17, further storing instructions thereon that, when executed by the at least one processor, cause the computer system to determine the attribution window based on a campaign associated with the digital impression.

19. The non-transitory computer-readable medium as recited in claim 18, further storing instructions thereon that, when executed by the at least one processor, cause the computer system to receive view-through conversion information by receiving a system call including view-through conversion information that comprises an indication of a successful conversion within the predetermined amount of time beginning with generating the first vector.

20. The non-transitory computer-readable medium as recited in claim 19, further storing instructions thereon that, when executed by the at least one processor, cause the computer system to: determine, at an end of the attribution window, that no view-through conversion information associated with the networking system user and the digital impression has been received; and associate the generated first vector with an unsuccessful view-through conversion; and train the machine learning model utilizing the generated first vector and the unsuccessful view-through conversion to predict additional view-through conversions.

* * * * *